United States Patent [19]
Sigling et al.

[11] Patent Number: 5,474,751
[45] Date of Patent: Dec. 12, 1995

[54] METHOD AND APPARATUS FOR REDUCING THE NITROGEN OXIDES IN FLUE GAS

[75] Inventors: Ralf Sigling, Baiersdorf; Franz Lankes, Hemhofen, both of Germany

[73] Assignee: Siemens Aktiengesellschaft, Munich, Germany

[21] Appl. No.: 301,831

[22] Filed: Sep. 6, 1994

Related U.S. Application Data

[63] Continuation of Ser. No. 16,015, Feb. 10, 1993, abandoned.

[30] Foreign Application Priority Data

Feb. 14, 1992 [EP] European Pat. Off. .............. 92102495

[51] Int. Cl.⁶ ........................... B01D 53/56; B01D 53/88
[52] U.S. Cl. ................ 423/239.1; 422/177; 422/219
[58] Field of Search ..................... 422/172, 177, 422/178, 211, 219, 174, 180; 423/239.1

[56] References Cited

U.S. PATENT DOCUMENTS

| | | | |
|---|---|---|---|
| 2,236,138 | 3/1941 | Howard | 422/177 |
| 3,972,184 | 8/1976 | Warren | 422/172 |
| 4,160,009 | 7/1979 | Hamabe | 422/177 |
| 5,009,856 | 4/1991 | Tenger et al. | 422/178 |
| 5,058,380 | 10/1991 | Pelters et al. | 422/172 |
| 5,198,002 | 10/1993 | Mei et al. | 422/177 |
| 5,240,470 | 8/1993 | Wright | 422/178 X |
| 5,288,309 | 2/1994 | Wright | 96/22 |
| 5,356,597 | 10/1994 | Wright et al. | 422/177 X |

FOREIGN PATENT DOCUMENTS

| | | |
|---|---|---|
| 0386328 | 9/1990 | European Pat. Off. . |
| 3535208 | 4/1987 | Germany . |
| 1052103 | 12/1966 | United Kingdom ................ 422/177 |

*Primary Examiner*—Robert J. Warden
*Assistant Examiner*—Theresa T. Snider
*Attorney, Agent, or Firm*—Herbert L. Lerner; Laurence A. Greenberg

[57] ABSTRACT

Combustion systems have a combustion apparatus, heating surfaces downstream of the combustion apparatus in a flue gas stream, and a deNO$_x$ catalyst. A method for reducing nitrogen oxides in the flue gas of the combustion systems includes selectively assigning the deNO$_x$ catalyst to a position inside and a position outside the flue gas stream as a function of a nitrogen oxide concentration or of a selected energy carrier. An apparatus for reducing nitrogen oxides in the flue gas of the combustion system includes a device for selectively assigning the deNO$_x$ catalyst to a position inside and a position outside a line through which the flue gas flows.

20 Claims, 7 Drawing Sheets

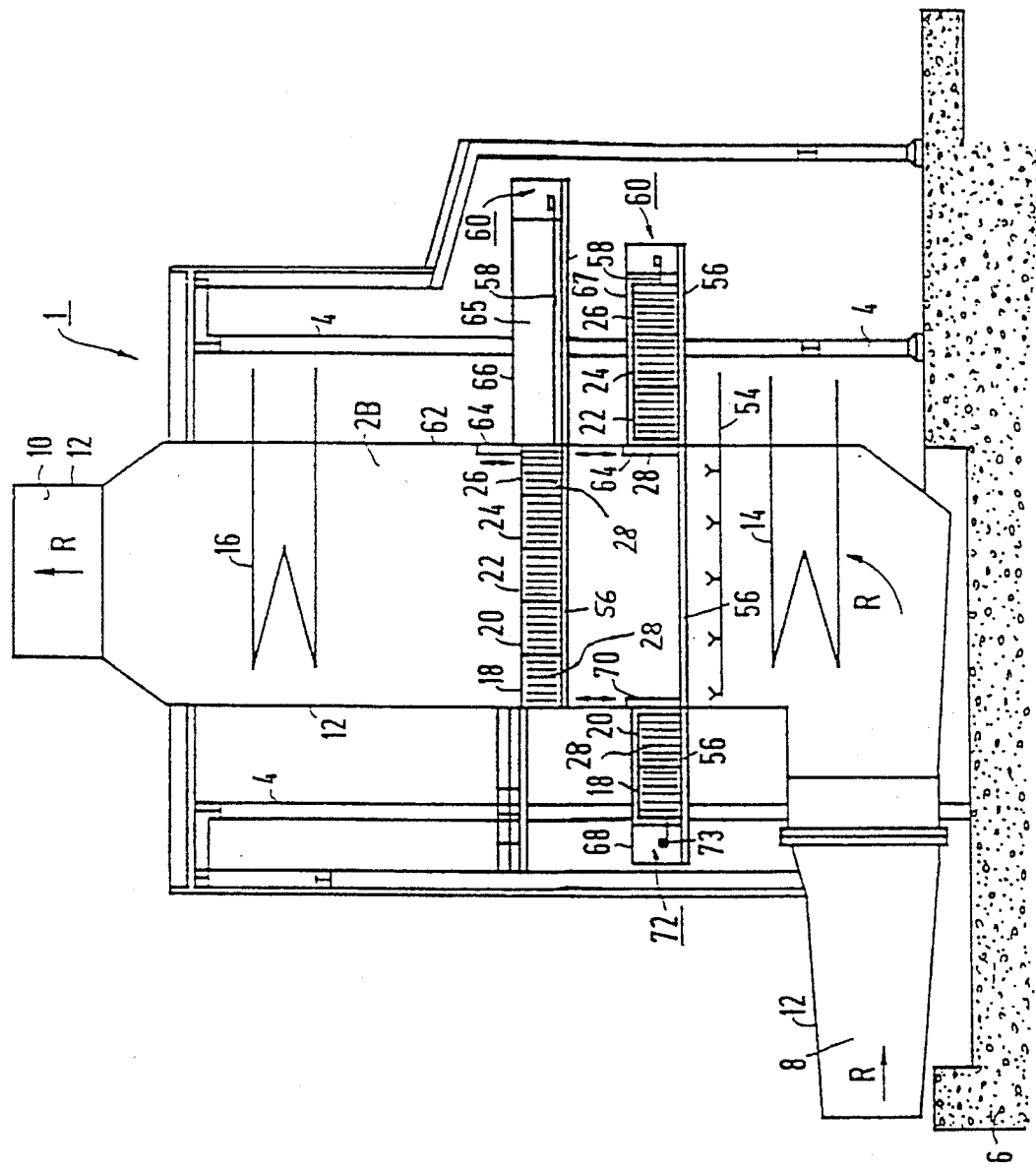

METHOD AND APPARATUS FOR REDUCING THE NITROGEN OXIDES IN FLUE GAS

This application is a continuation, of application Ser. No. 08/016,015, filed Feb. 10, 1993.

BACKGROUND OF THE INVENTION

1. Field of the Invention

The invention relates to a method and an apparatus for reducing the nitrogen oxides in flue gas of combustion systems, having a combustion apparatus, heating surfaces following the combustion apparatus and being located in the flue gas stream, and a deNO$_x$ catalyst.

In view of the emissions limits for nitrogen oxides (NO$_x$), primary and secondary provisions are being taken to reduce the ejection of NO$_x$. The term primary provisions is understood to mean provisions in which the formation of nitrogen oxides is lessened. Since the formation of nitrogen oxides is highly temperature-dependent, that category includes, among others, all provisions with which the flame temperature is reduced. The term secondary provisions is understood to mean all provisions with which the nitrogen oxide concentration in the flue gas is reduced afterward. To that end, deNO$_x$ catalysts are typically integrated into the flue gas line.

With gas firing, the required limit values for NO$_x$ emissions can be met solely by primary provisions, even without secondary provisions. However, when heating oil is used, even if the usual primary provisions such as injecting water into the flame are employed, the required limit values are not always met. In that case, the use of deNO$_x$ catalysts is necessary. However, the use of deNO$_x$ catalysts entails disadvantages. Those are a pressure loss in the flue gas line, with the attendant worsening of the efficiency of the system, an SO$_2$/SO$_3$ conversion which is especially undesirable because of the attendant ammonium sulfate formation, a gradual deactivation of the catalysts and the attendant need to recharge the catalysts, and a limitation of the startup speed of a gas turbine resulting from a maximum allowable temperature gradient of the catalyst.

Combustion systems such as gas turbines, which are fueled with gas and heating oil in alternation, require the use of deNO$_x$ catalysts in the one case but not in the other. For that reason, such combustion systems are usually equipped with deNO$_x$ catalysts.

SUMMARY OF THE INVENTION

It is accordingly an object of the invention to provide a method and an apparatus for reducing the nitrogen oxides in flue gas, which overcome the hereinafore-mentioned disadvantages of the heretofore-known methods and apparatuses of this general type and which make it possible to meet the necessary limit values for NO$_x$ emissions while having to accept the aforementioned disadvantages only to the extent that is absolutely necessary. In particular, it should be possible to fuel a gas turbine system with various energy carriers or fuels while meeting existing emissions limits, and at the same time to attain the highest possible total efficiency in all operating states of the system.

With the foregoing and other objects in view there is provided, in accordance with the invention, in a method for reducing nitrogen oxides in flue gas of combustion systems having a combustion apparatus, heating surfaces downstream of the combustion apparatus in a flue gas stream, and a deNO$_x$ catalyst, the improvement which comprises selectively assigning the deNO$_x$ catalyst to a position inside or a position outside the flue gas stream depending on a nitrogen oxide concentration. As a result, the disadvantages that the use of deNO$_x$ catalysts entail have to be accepted only if this is absolutely necessary because of the nitrogen oxide concentration.

With the objects of the invention in view, there is also provided, in a method for reducing nitrogen oxides in flue gas of combustion systems having a combustion apparatus, heating surfaces downstream of the combustion apparatus in a flue gas stream, and a deNO$_x$ catalyst, the improvement which comprises selectively assigning the deNO$_x$ catalyst to a position inside or a position outside the flue gas stream depending on a selected energy carrier. This proposes a simple criterion for the use of the deNO$_x$ catalyst.

With the objects of the invention in view, there is additionally provided an apparatus for reducing nitrogen oxides in the flue gas of a combustion system, comprising means for selectively assigning the deNO$_x$ catalyst to a position inside or a position outside a line through which the flue gas flows. As a result, the deNO$_x$ catalyst is located in the flue gas stream only if existing emissions limits would otherwise be exceeded.

In accordance with another feature of the invention, there are provided means for selectively passing the flue gas through the deNO$_x$ catalyst or past the deNO$_x$ catalyst positioned in the flue gas line. As a result, the deNO$_x$ catalyst need no longer be moved. It is sufficient if the flue gas stream is deflected by the actuation of flaps or slides.

In accordance with a further feature of the invention, there is provided a bypass line that bypasses the deNO$_x$ catalyst and a deflector for the flue gas. As a result, as needed, the flue gas can flow through the deNO$_x$ catalyst or through the bypass line past the deNO$_x$ catalyst merely by adjusting the deflector. Due to this provision, the service life of the deNO$_x$ catalyst, or of a module including such catalysts, becomes longer, since the only time that must be taken into account in constructing the deNO$_x$ catalyst in view of its service life is the time during which the deNO$_x$ catalyst will be located in the flue gas stream.

In accordance with an added feature of the invention, there are provided means for introducing the deNO$_x$ catalyst into and removing the deNO$_x$ catalyst again from, the line through which the flue gas flows. In this way, a separate bypass line for the flue gas becomes unnecessary.

In accordance with an additional feature of the invention, there are provided means for moving the deNO$_x$ catalyst into and out of the flue gas stream or the line through which the flue gas flows. This could also be done by rotation or swiveling.

In accordance with again another feature of the invention, there is provided an electromotive adjusting device for the deNO$_x$ catalyst. An electromotive adjustment is a term understood to include a hydraulic drive as well.

In accordance with again a further feature of the invention, the deNO$_x$ catalyst is disposed upstream and/or downstream of a heat exchanger in the line through which the flue gas flows, as seen in flow direction of the flue gas. This makes it possible, particularly in an apparatus that includes a bypass line and a deflector for the flue gas, to perform cooling of the flue gas upstream of the deNO$_x$ catalyst and/or heating of the flue gas downstream of the deNO$_x$ catalyst, if the flue gas is not flowing through the bypass line.

In accordance with again an added feature of the invention, there are provided means for moving the deNO$_x$ catalyst into and out of a waste heat boiler. Operation without a deNO$_x$ catalyst and without the attendant disadvantages is then possible upon changing to an energy carrier with which less nitrogen oxide is produced on the primary side.

In accordance with again an additional feature of the invention, there is provided a parking position for receiving the deNO$_x$ catalyst, the parking position being disposed outside the line through which flue gas flows. This enables easy access to the deNO$_x$ catalyst when it is in the parking position, without requiring shutoff of the combustion system. Moreover, with these provisions, the dimensions of a waste heat boiler can be made smaller, since space is no longer required in the waste heat boiler for inspection tours of the deNO$_x$ catalyst.

In accordance with yet another feature of the invention, there is provided a wall of the line through which the flue gas flows, a housing as the parking position being disposed upstream of an opening formed in the wall of the line, and means for closing the opening in a flue-gas-tight manner and for enabling a passage of the deNO$_x$ catalyst through the opening. This prevents overly rapid cooling down of the deNO$_x$ catalyst after it is moved out of the line through which flue gas flows.

In accordance with yet a further feature of the invention, the parking position has a configuration for heating the deNO$_x$ catalyst.

In accordance with yet an added feature of the invention, there are provided means for heating the deNO$_x$ catalyst with a heating medium selected from the group consisting of flue gas, hot water and steam. In accordance with yet an additional feature of the invention, there is provided an electric heater for heating the deNO$_x$ catalyst. As a result, in the parking position, the deNO$_x$ catalyst is heated slowly, with a low temperature gradient, or is kept at operating temperature and then can be moved into the line through which the flue gas flows as rapidly as needed, without a sudden great temperature jump. Heating or maintaining the temperature of the deNO$_x$ catalyst also serves substantially to prevent the temperature in the parking position from dropping below the dew point (water and acid dew point), thereby averting damage to the deNO$_x$ catalyst from a drop below the dew point.

In order to denitrify the flue gas, a plurality of catalyst levels may be provided, wherein each catalyst level can be separately assigned a position inside and outside the line through which flue gas flows.

In accordance with yet an additional feature of the invention, there is provided a further level of the deNO$_x$ catalyst, and at least one further parking position disposed outside the line through which the flue gas flows for receiving the further level of the deNO$_x$ catalyst.

In accordance with still another feature of the invention, there is provided an element case for the deNO$_x$ catalyst, and at least one further parking position disposed outside the line through which the flue gas flows for receiving the element case for the deNO$_x$ catalyst.

In accordance with still a further feature of the invention, there is provided a bay in the line through which the flue gas flows for receiving the deNO$_x$ catalyst.

In accordance with still an added feature of the invention, there is provided a further level of the deNO$_x$ catalyst, and at least one further bay in the line through which the flue gas flows for receiving the further level of the deNO$_x$ catalyst.

In accordance with still an additional feature of the invention, there is provided an element case of the deNO$_x$ catalyst being received in the bay in the line through which the flue gas flows.

In accordance with another feature of the invention, there is provided a further element case of the deNO$_x$ catalyst, and at least one further bay in the line through which the flue gas flows for receiving the further element case of the deNO$_x$ catalyst.

In accordance with a further feature of the invention, the bay includes a device for heating the deNO$_x$ catalyst.

In accordance with an added feature of the invention, there is provided a partition separating the deNO$_x$ catalyst from the flue gas and heating the deNO$_x$ catalyst through which flue gas does not flow.

In accordance with a concomitant feature of the invention, the deNO$_x$ catalyst is disposed in catalyst planes, and each of the catalyst planes is separately assigned to a position inside and a position outside the line through which the flue gas flows.

Other features which are considered as characteristic for the invention are set forth in the appended claims.

Although the invention is illustrated and described herein as embodied in a method and an apparatus for reducing the nitrogen oxides in flue gas, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawings.

FIG. 7 is a view corresponding to a combination of FIGS. 2 and 3.

DESCRIPTION OF THE PREFERRED EMBODIMENTS

Figure 1:
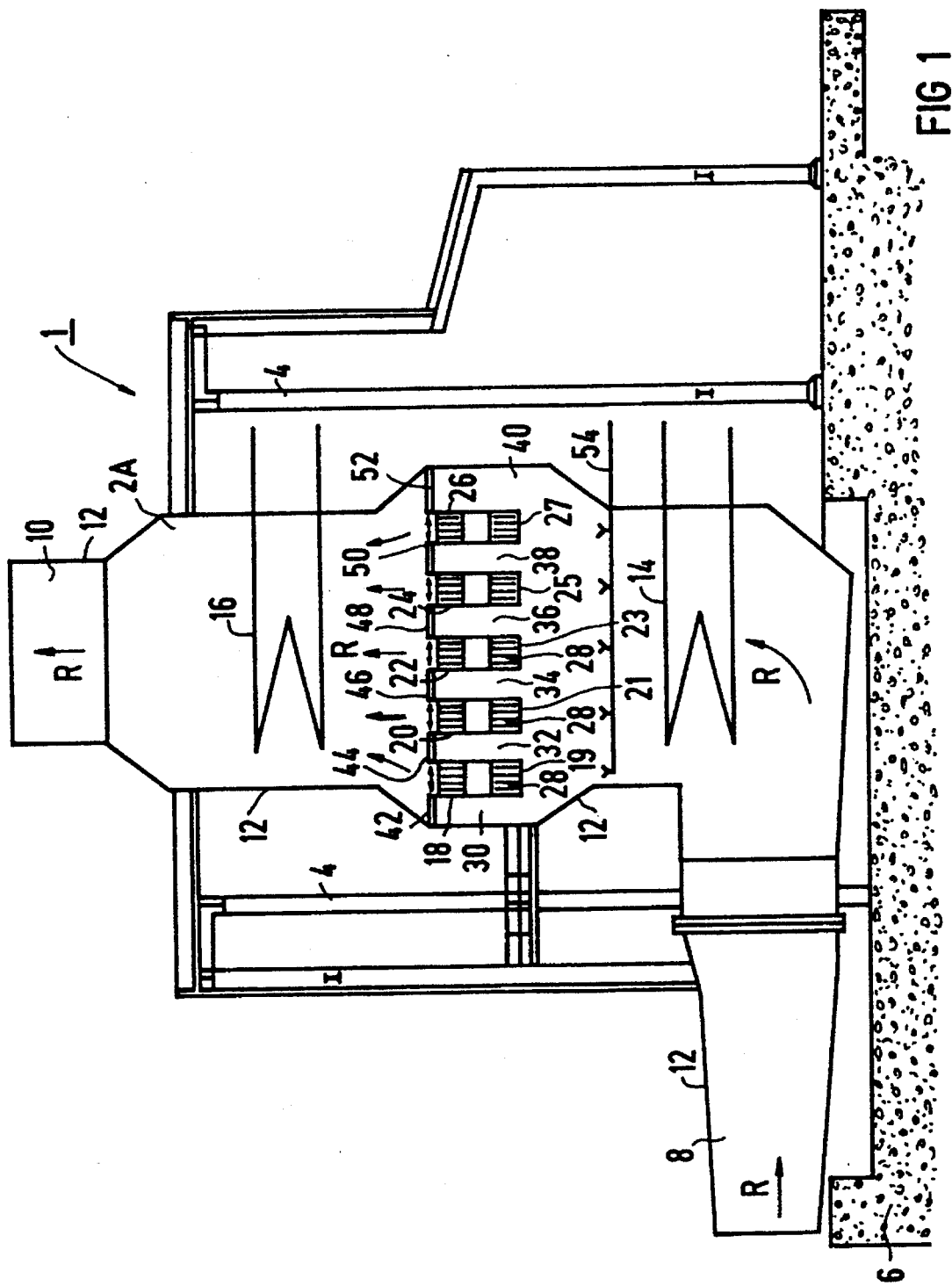
FIG. 1 is a fragmentary, diagrammatic, partly sectional view of an apparatus with a waste heat boiler and a built-in deNO$_x$ catalyst and with a bypass for flue gas.

Referring now to the figures of the drawing in detail and first, particularly, to FIG. 1 thereof, there is seen an apparatus 1 having a waste heat boiler 2A which is suspended in a framework 4 that extends on a foundation 6. On the inlet side, the waste heat boiler 2A communicates with a flue gas conduit 8 of a non-illustrated gas turbine. On the outlet side, the waste heat boiler 2A discharges into a stack 10. The flue gas conduit 8, the waste heat boiler 2A and the stack 10 together form a line 12 through which flue gas R flows. Various heating surfaces 14, 16 add deNO$_x$ catalysts 28 built into various element cases 18–27, can be seen in deNO$_x$ catalysts are catalyst plates 28 which are shown in the the waste heat boiler 2A. In the exemplary embodiments, the element cases 18–27. They could equally well be honeycomb catalysts. The element cases 18–27 are disposed at two levels one above the other. Bypass conduits 30–40 for the flue gas R are provided between the element cases 18–27, for bypassing the element cases 18–26. In the exemplary embodiment, these bypass conduits 30–40 are closed by slides 42–52. The slides 42–52 may be slid over the element cases 18–27, instead of over the bypass conduits 30–40. The cross section of the waste heat boiler 2A is widened in the region of the deNO$_x$ catalysts 28. An injection device 54 for ammonia is shown in diagrammatic form under the deNO$_x$ catalysts 28.

When the system is in operation, the flue gas R flows out of the non-illustrated gas turbine through the flue gas conduit 8 and through the waste heat boiler 2A to the stack 10. In this process, it first gives up some of its heat to the heating surfaces 14 preceding the deNO$_x$ catalysts. As it passes the injection device 54 for ammonia, the ammonia is admixed with the flue gas R. The ammonia-enriched flue gas R is prevented from flowing through the bypass conduits 30–40 and bypassing the element cases 18–27, by the slides 42–52 that close the bypass conduits 30–40. Upon flowing through the element cases 18–27, the nitrogen oxides in the flue gas are reduced at the catalysts 28. The denitrified flue gas R gives up at least some of its remaining heat to the heating surfaces 16 downstream of the deNO$_x$ catalysts 28, before flowing into the stack 10.

In cases in which primary provisions, such as the selection of a different fuel, result in less nitrogen oxide being produced in the flue gas than would be permitted, it is possible for the slides 42–52 to be slid over the element cases 18–27, from the positions shown in FIG. 1, so that the bypass conduits 30–40 are opened up. The disadvantages entailed by the use of the catalyst are then avoided and the deNO$_x$ catalyst 28 is protected.

Figure 2:
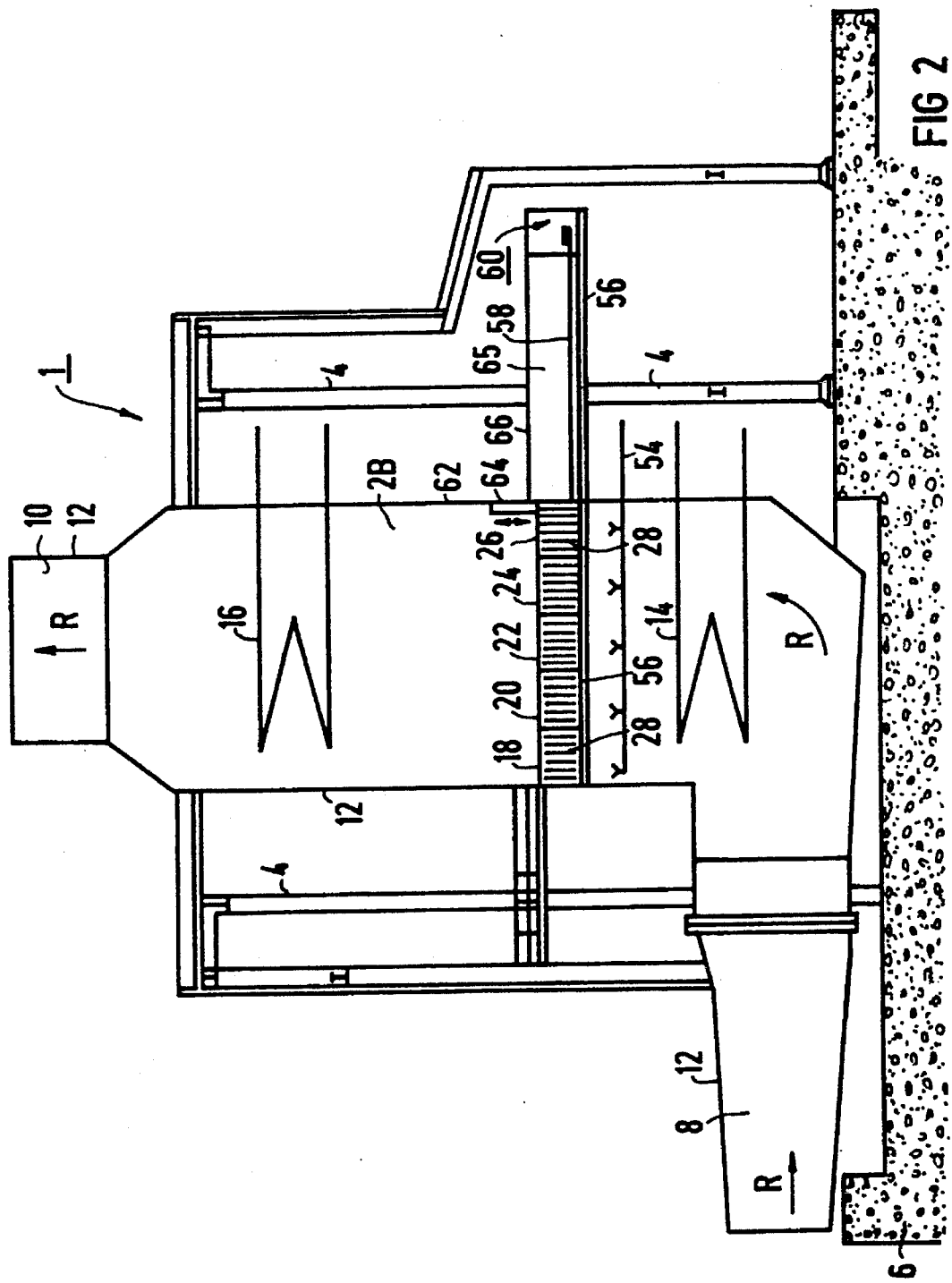
FIG. 2 is a view similar to FIG. 1 of a waste heat boiler and a deNO$_x$ catalyst that can be moved out of the waste heat boiler.

FIG. 2 shows a waste heat boiler 2B, which is similar in structure to that of FIG. 1 and like the structure of FIG. 1 is suspended within a framework 4. However, in the waste heat boiler 2B shown in FIG. 2, the deNO$_x$ catalyst 28 is located in a guide rail 56. It is shown in the inserted position. The element cases 18–26 then form one catalyst level, which fills the entire cross section of the waste heat boiler 2B. The element cases 18–26 are displaceably supported on the guide rail 56 and are connected to a displacement device 58, 60. A slide or housing closure 64 is built into a wall 62 of the waste heat boiler 2B and closes off a housing 66 that is located outside the waste heat boiler 2B and is intended to receive the deNO$_x$ catalyst 28 in a parking position 65 or in other words in its extended position, in such a manner as to be flue-gas-tight from the waste heat boiler 2B. The displacement device 58, 60 is also disposed in the housing 66.

Through the use of the displacement device 58, 60, the deNO$_x$ catalyst 28 can be hydraulically or electrically retracted from and inserted back into the flue gas stream R in the waste heat boiler 2B along the guide rail 56. If, as in the operating situation assumed in FIG. 2, secondary provisions are necessary for denitrifying the flue gas R, then the deNO$_x$ catalyst 28 is located entirely in the waste heat boiler 2B outside the housing 66, or in other words in the inserted position as shown. This can represent the case of gas turbine operation using heating oil as the energy carrier. However, if the NO$_x$ concentration in the flue gas R is lowered by primary measures, such as the selection of natural gas as an energy carrier, far enough that operation without a deNO$_x$ catalyst 28 stays below the permissible limit values, then the deNO$_x$ catalyst 28 can be moved over the guide rail 56 by means of the displacement device 58, 60 to the parking position 65, which is enclosed by the housing 66 in the exemplary embodiment. Alternatively to the situation shown in FIG. 2, the deNO$_x$ catalyst 28 may rest on the framework 4 in the parking position 65, without being surrounded by the housing 66. A further option for receiving the deNO$_x$ catalyst 28 in the extended position is to shape the housing 66 in the waste heat boiler 2B as a bay 76 or bulge, in which case the deNO$_x$ catalyst 28 is then in a state of direct heat exchange with the flue gas R. This may also be the case if the deNO$_x$ catalyst 28 is in the flue-gas-tight housing 66 and the housing or slide closure 64 is dispensed with.

Figure 3:
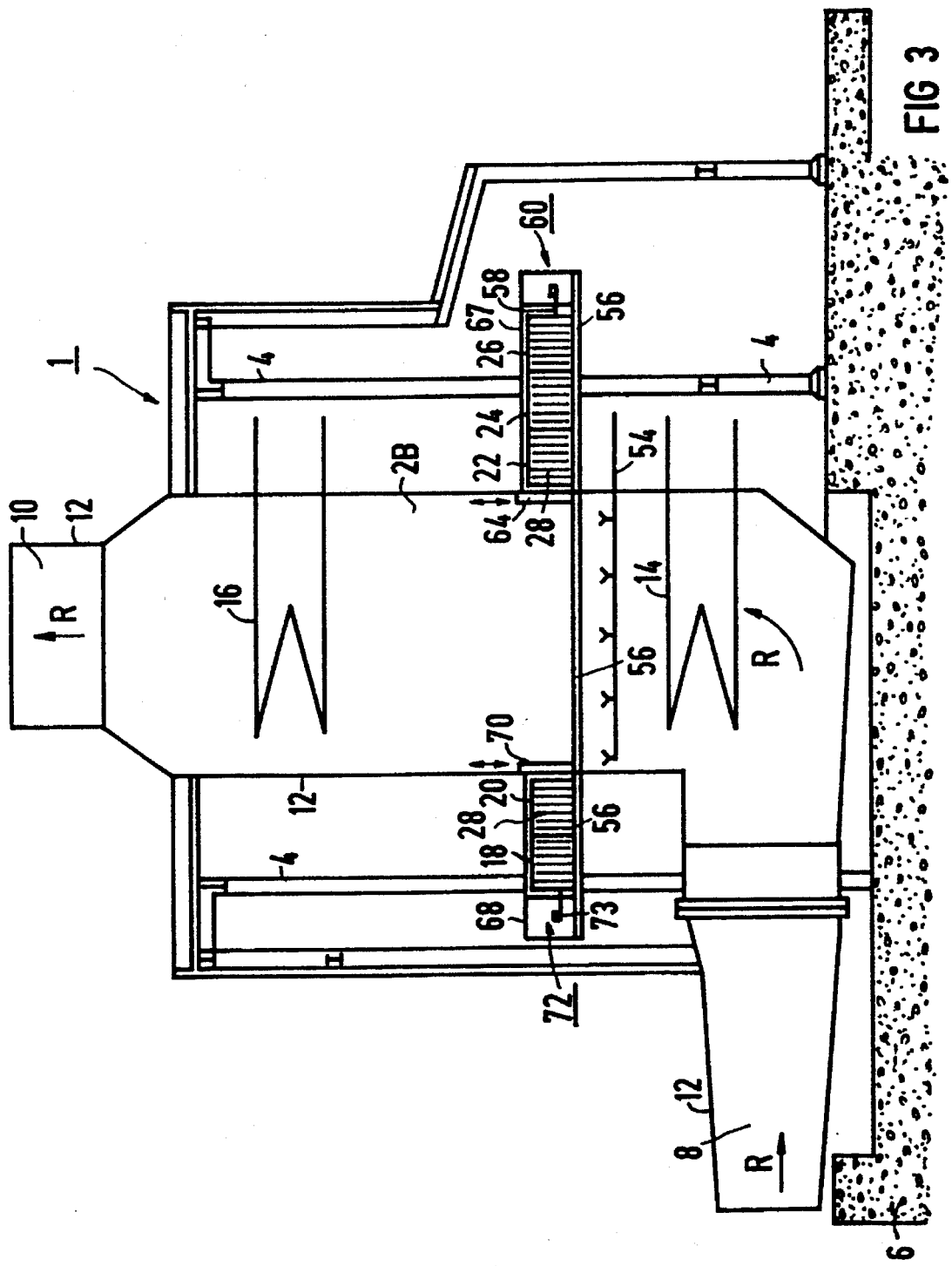
FIG. 3 is a fragmentary, partly sectional view of a variant of the exemplary embodiment of FIG. 2 in which the deNO$_x$ catalyst can be simultaneously displaced in two directions.

FIG. 3 in conjunction with FIG. 2 shows a horizontal adjustability of the deNO$_x$ catalyst 28 in two directions in an identical waste heat boiler 2B. Element cases 22, 24, 26 having the deNO$_x$ catalyst 28 are accommodated in a housing 67. A housing 68 that is supported by the framework 4 is analogously provided for receiving the element cases 18, 20 having the deNO$_x$ catalyst 28. The housings 67, 68, which may be shaped as bays 77, 78 or bulges as well, are then located at the same level. Like the housing 67, the housing 68 has a flue-gas-tight slide or housing closure 70. Through the use of a displacement device 72, 73, which may be electric or hydraulic, the deNO$_x$ catalyst 28 can be inserted into and removed again from the flue gas stream R in the waste heat boiler 2B. The configuration of the deNO$_x$ catalyst 28 shown in FIG. 3 may be necessary in order to make better use of space in the area around the waste heat boiler 2B. It has an advantageous mechanical displaceability, since only relatively small catalyst masses have to be moved. Moreover, because the depth of the housings 67, 68 is less than that of the housing 66 in FIG. 2, it enables a more uniform tempering of the element cases 18–26 inserted into parking positions in the housings 67, 68.

Figure 4:
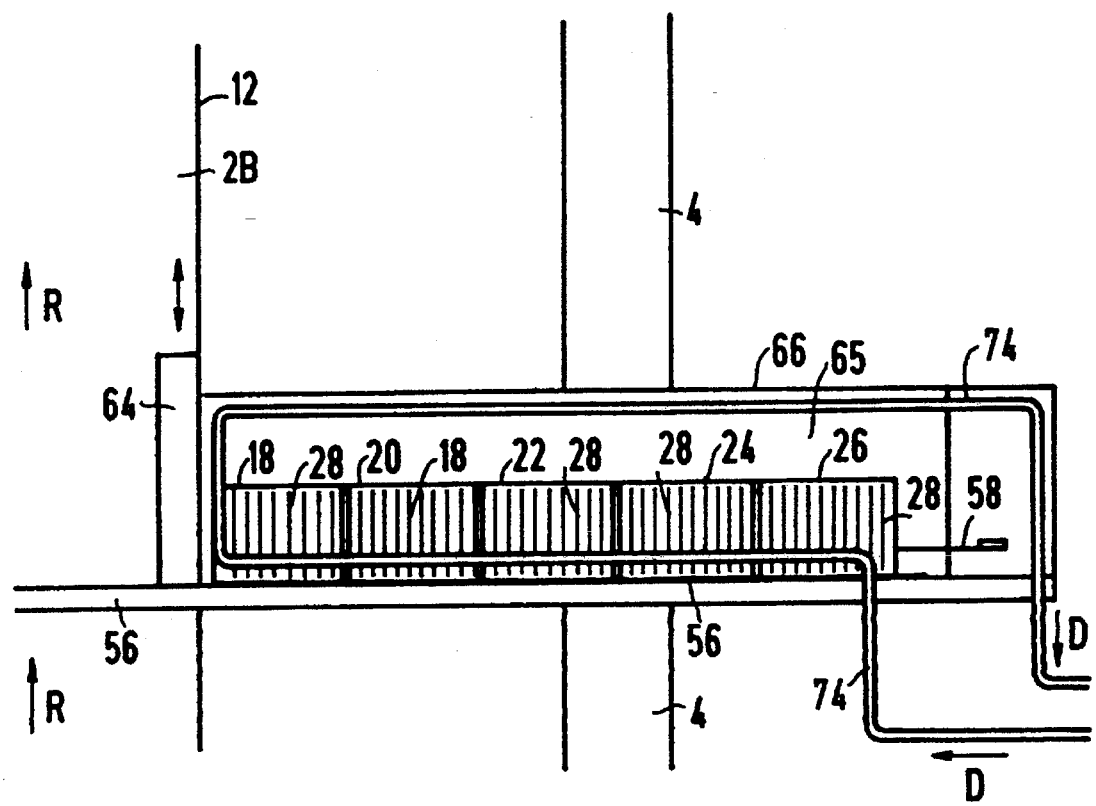
FIG. 4 is an enlarged, fragmentary view of the configuration of FIG. 2, with a heater for the deNO$_x$ catalyst.
Figure 5:
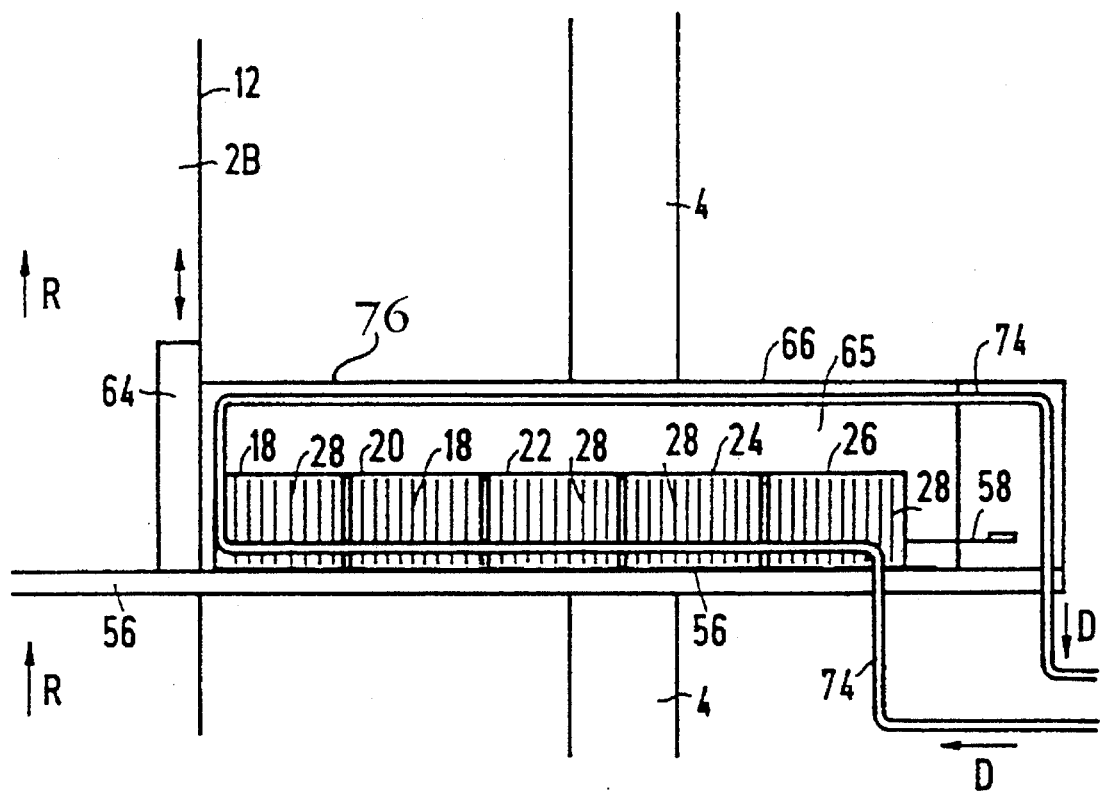
FIG. 5 is a view similar to FIG. 4, showing the deNO$_x$ catalyst and the heater in a bay.
Figure 6:
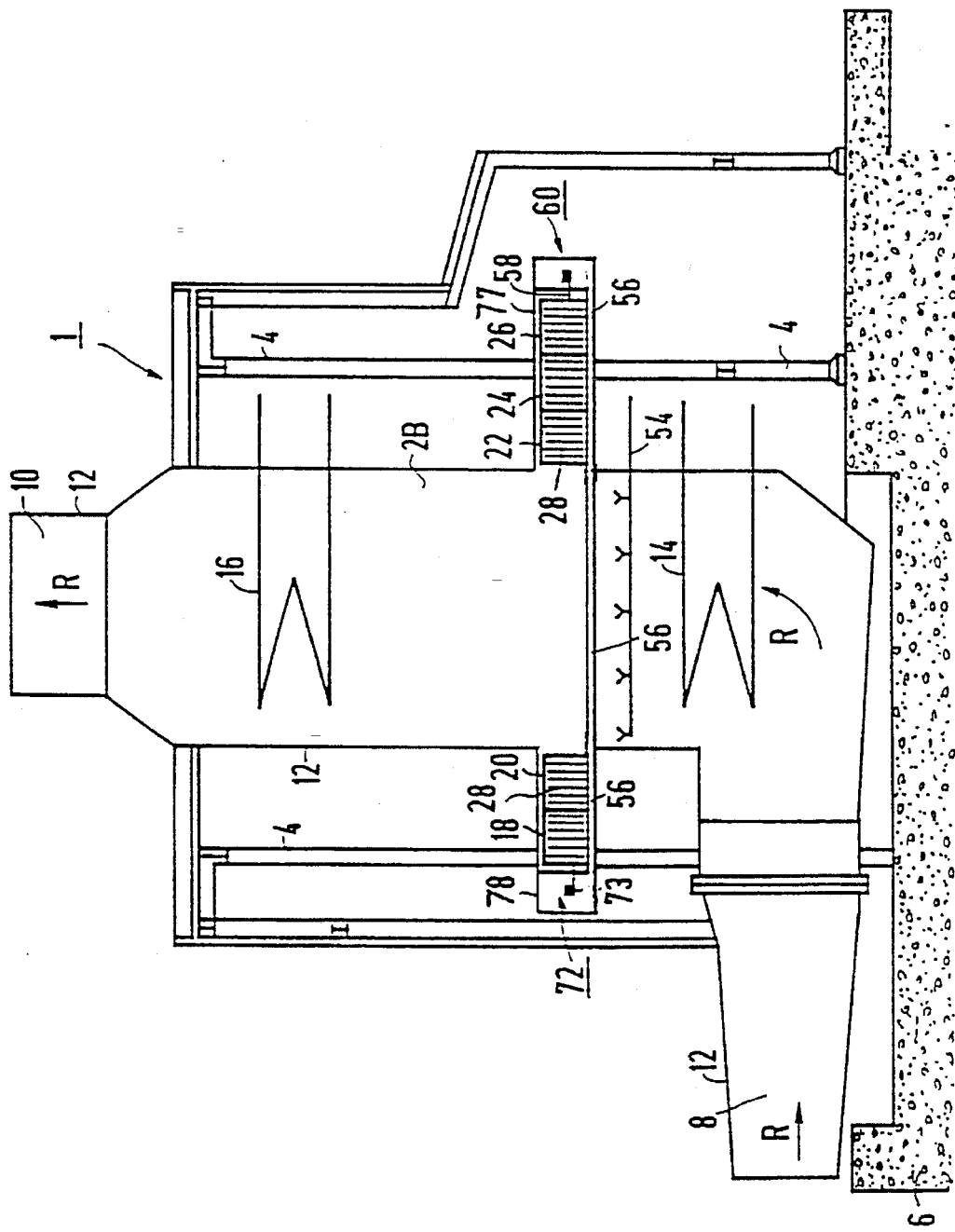
FIG. 6 is a view similar to FIG. 3 showing the channel with two bays.

FIG. 4 shows the housing 66 of FIG. 2 on a larger scale. It can be seen that the housing 66 is equipped with a heating line 74. This line may be charged with steam D or hot water, as needed.

Once the forthcoming insertion of the deNO$_x$ catalyst 28 into the waste heat boiler 2B can be expected, the deNO$_x$ catalyst 28 located in the housing 66 can be gradually heated through the use of the heating line 74. Then, the deNO$_x$ catalyst 28 is not subjected to a sudden major temperature change when it is inserted into the waste heat boiler 2B. This lengthens its service life, because it is subjected to less alternating thermal strain. Moreover, in this way it can be brought to the full operating temperature and thus can be functional immediately. If it is inserted and retracted relatively often, it may also be kept continuously tempered in the housing 66.

Alternatively to the exemplary embodiment of FIG. 4, the deNO$_x$ catalyst 28 can be heated by means of an electric heater, instead of through the heating line 74.

The parking position 65 has the further advantage of permitting the deNO$_x$ catalyst 28 to be serviced and replaced in the parking position 65 during operation of the combustion device.

We claim:

1. In a method for reducing nitrogen oxides in flue gas of combustion systems having a combustion apparatus, heating surfaces downstream of the combustion apparatus in a flue gas stream, and wherein the nitrogen oxides in the flue gas are reduced by exposing the flue gas stream to a denitrification catalyst, the improvement which comprises:

selectively assigning the denitrification catalyst to a position essentially completely inside and a position essentially completely outside the flue gas stream as a function of a nitrogen oxide concentration.

2. In a method for reducing nitrogen oxides in flue gas generated by combusting a selected energy carrier in combustion systems having a combustion apparatus, heating surfaces downstream of the combustion apparatus in a flue gas stream, and wherein the nitrogen oxides in the flue gas are reduced by exposing the flue gas stream to a denitrification catalyst, the improvement which comprises:

selectively assigning the denitrification catalyst to a position essentially completely inside and a position essentially completely outside the flue gas stream as a function of the selected energy carrier.

3. In a combustion system in which a flue gas is generated by combustion of a selected energy carrier, the combustion system including a flue gas channel through which the flue gas flows, an apparatus for reducing nitrogen oxides in the flue gas of the combustion system, the apparatus comprising:

a denitrification catalyst for reducing nitrogen oxides in the flue gas, and means for selectively assigning said denitrification catalyst to a position essentially completely inside and a position essentially completely outside the flue gas channel as a function of a parameter selected from the group consisting of a nitrogen oxide concentration in the flue gas and the selected energy carrier.

4. The apparatus according to claim 3, wherein said means for selectively assigning include means for introducing said denitrification catalyst into and removing said denitrification catalyst from, the flue gas channel.

5. The apparatus according to claim 3, wherein said means for selectively assigning include a displacement device for the denitrification catalyst.

6. The apparatus according to claim 3, further comprising a first heat exchanger in the flue gas channel, said denitrification catalyst being disposed upstream of said first heat exchanger as seen in flow direction of the flue gas.

7. The apparatus according to claim 6, further comprising a second heat exchanger in the flue gas channel, said denitrification catalyst being disposed downstream of said second heat exchanger as seen in the flow direction of the flue gas.

8. The apparatus according to claim 3, further comprising a waste heat boiler disposed in the flue gas channel, and said assigning means include means for moving the denitrification catalyst into and out of the waste heat boiler.

9. The apparatus according to claim 8, further comprising a parking position disposed outside the flue gas channel, said parking position being intended for receiving said denitrification catalyst when said denitrification catalyst is assigned to the position essentially completely outside the flue gas channel.

10. The apparatus according to claim 9, further comprising a level of said denitrification catalyst, said level having a plurality of element cases, and at least one further parking position disposed outside the flue gas channel for receiving a given number of said element cases.

11. The apparatus according to claim 9, further comprising a wall of the flue gas channel, said wall having an opening formed therein, a housing disposed at said opening and defining said parking position outside the flue gas channel, and means for closing said opening in a flue-gas-tight manner and said assigning means are means for enabling a passage of said denitrification catalyst through said opening between said housing and the flue gas channel.

12. The apparatus according to claim 9, wherein said parking position further comprises a device for heating said denitrification catalyst.

13. The apparatus according to claim 12, wherein said device for heating includes means for heating the denitrification catalyst with a heating medium selected from the group consisting of flue gas, hot water and steam.

14. The apparatus according to claim 12, wherein said device for heating includes an electric heater for heating the denitrification catalyst.

15. The apparatus according to claim 3, further comprising a bay in the flue gas channel for receiving said denitrification catalyst when said denitrification catalyst is assigned to the position essentially completely outside the glue gas channel.

16. The apparatus according to claim 15, further comprising a level of said denitrification catalyst, said level having a plurality of element cases, and at least one further bay in the flue gas channel at said level for receiving a given number of said element cases.

17. The apparatus according to claim 15, wherein said bay further comprises a device for heating said denitrification catalyst.

18. The apparatus according to claim 3, wherein said denitrification catalyst is disposed in a given number of catalyst planes, and each of the catalyst planes is separately assigned selectively to a position completely inside and a position completely outside the flue gas channel.

19. In a combustion system in which a flue gas is generated by combustion of a selected energy carrier, the combustion system including a flue gas channel through which the flue gas flows, an apparatus for reducing nitrogen oxides in the flue gas of the combustion system, the apparatus essentially consisting of:

a denitrification catalyst for reducing nitrogen oxides in the flue gas, and means for selectively exposing said denitrification catalyst to essentially all of the flue gas flowing through the flue gas channel and preventing the flue gas from flowing through said denitrification catalyst as a function of a parameter selected from the group consisting of a nitrogen oxide concentration in the flue gas and the selected energy carrier.

20. The apparatus according to claim 19, further comprising a bypass line for the flue gas bypassing said denitrification catalyst, and a deflector for the flue gas.

* * * * *